UNITED STATES PATENT OFFICE.

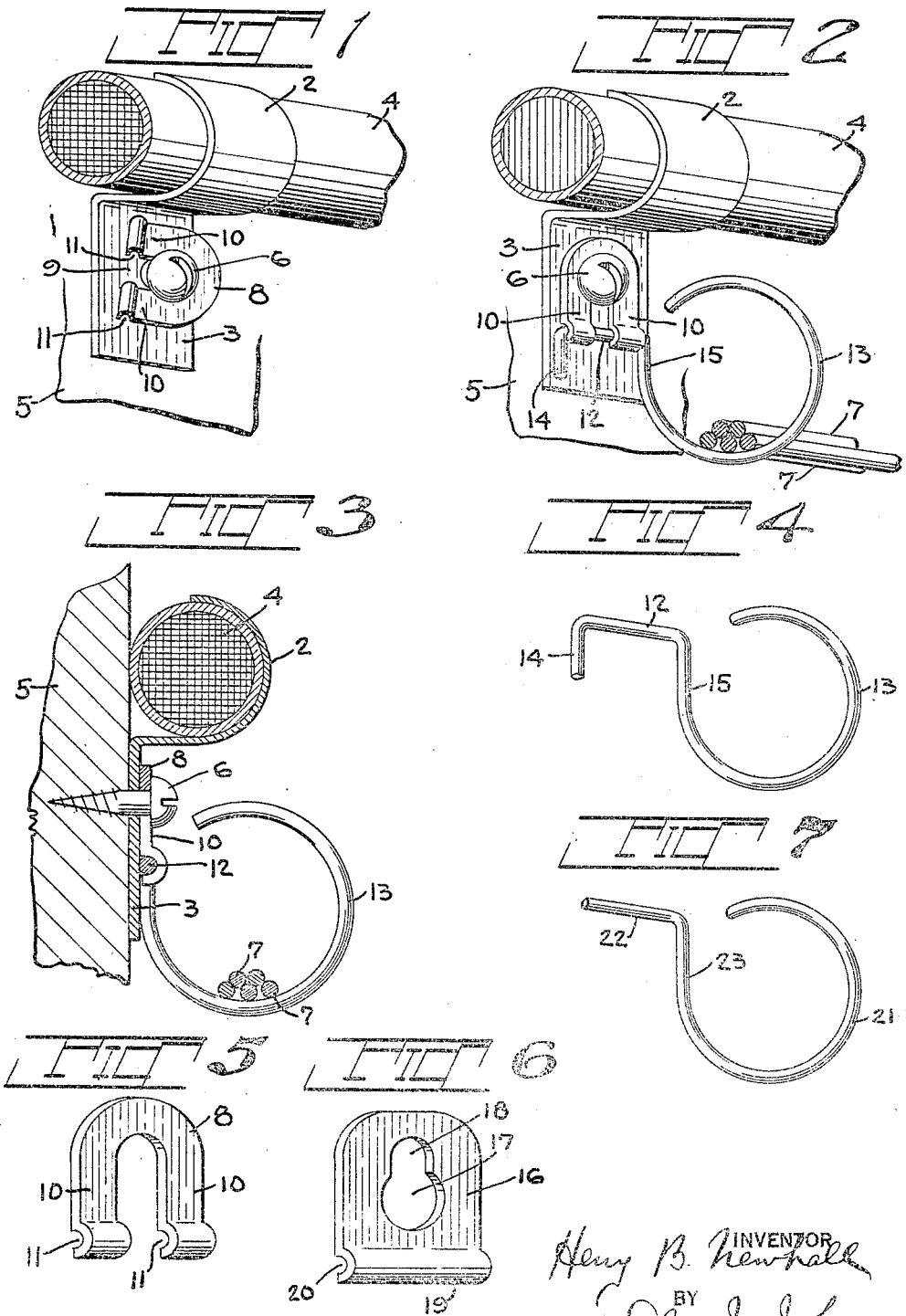

HENRY B. NEWHALL, OF PLAINFIELD, NEW JERSEY.

CONDUIT OR CABLE CLAMP AND BRIDLE-RING.

1,381,219.  Specification of Letters Patent.  Patented June 14, 1921.

Application filed July 14, 1920. Serial No. 396,137.

*To all whom it may concern:*

Be it known that I, HENRY B. NEWHALL, a citizen of the United States, resident of Plainfield, in the county of Union and State of New Jersey, have invented certain new and useful Improvements in Conduit or Cable Clamps and Bridle-Rings, of which the following is a specification, taken in connection with the accompanying drawings.

My invention relates to means for securing a bridle ring to a conduit or cable clamp. More particularly my invention relates to securing the shank of a pigtail bridle ring to a conduit or cable clamp by means of a removable securing member coöperating with the shank, and with the head of the securing screw of the conduit or cable clamp.

My invention further relates to certain combinations and sub-combinations, details of construction and articles of manufacture all of which will be more fully hereinafter described and pointed out in the claims.

In the drawings in which I have shown different embodiments of my invention the same reference numerals refer to similar parts in the several figures.

Figure 1 is a perspective view of a cable, a conduit or cable clamp, and one form of my removable supporting member in its first attaching position;

Fig. 2 is a perspective view, similar to Fig. 1, except that the supporting member has been swung down into a vertical position and the bridle ring secured to the conduit or cable clamp;

Fig. 3 is a vertical section through Fig. 2;

Fig. 4 is a detail perspective view of the preferred form of pigtail bridle ring which I employ;

Fig. 5 is a perspective view of the preferred form of removable securing member;

Fig. 6 is a perspective view of a different form of securing member;

Fig. 7 is a perspective view of a slightly different form of bridle ring.

In the commercial use of conduit or cable clamps it is not generally possible, at the date of the original installation, to determine whether or not bridle rings will be needed to support additional loose strands of bridle wires. In commercial practice, a cable is supported on a wall or other suitable support and it may be weeks, months, or years later that the telephone engineers will determine that it is desirable to support bridle wires parallel to the cable.

By my invention runs of bridle wires may be supported by the same conduit or cable clamp and the same securing screw, by simply slipping a removable securing member beneath the head of the screw and then tightening the screw.

Any form of suitable conduit or cable clamp 1 may be used having the hook portion 2 and the base 3. This conduit or cable clamp supports the cable 4 on the wall or other suitable support 5, by means of the securing screw 6.

Whenever it is desired to increase the capacity of the installation by adding runs of bridle wires 7, 7 this may be readily done by loosening the screw 6 and slipping the removable securing member 8 beneath the head of the screw. Preferably, though not necessarily, this removable securing member is provided with a slot 9 and two arms 10, 10, each of the arms being bent to form grooves 11, 11 for the reception of the horizontal shank 12 of a pigtail bridle ring 13.

In positioning the parts, the head of the screw 6 is loosened slightly and the removable securing member 8 is slipped beneath the head as shown for example in Fig. 1. It is then swung down into a vertical position, and the shank 12 of the bridle ring 13 is placed in the grooves 11, 11. The screw is then again tightened so that its head will firmly clamp the securing member 8 against the base 3 of the conduit or cable clamp and securely, but removably, hold the shank 12 to the conduit or cable clamp 1. Preferably, though not necessarily, the end 12 of the shank is bent to form an arm 14 which lies against the base and serves to prevent rotation of the shank within the removable securing member 8 and also prevents lateral withdrawal of the shank. The vertical portion 15 of the bridle ring 13 also assists in this action.

Instead of using a removable securing member as shown in Figs. 1, 2, 3, and 5, I may form my securing member in any other suitable manner as for example in Fig. 6, in which the securing member 16 is provided with a slot 17 having a narrow portion 18 to fit under the head of the screw 6 and be clamped. The end 19 is bent to form a horizontal groove 20 which is the same as the groove 11, 11 in the member 8.

Instead of providing my pigtail bridle ring 13 with an arm 14, I may, in some cases, use a pigtail bridle ring 21, Fig. 7, having a shank 22, and a vertical portion 23, but no arm 14, as shown in Fig. 4.

Should it ever be desirable to remove the bridle wires 7, 7 and the bridle ring, this can be easily done by again loosening the screw 6 sufficiently to disengage the shank 12 from the grooves 11, 11 or 20, as the case may be, and then removing the removable securing member from the conduit or cable clamp. After the removable member is disengaged from the screw, the screw is again tightened.

It will be noted that no tapping or screw-threading of the conduit or cable clamp is required, nor is it necessary to place screw-threads upon the different forms of bridle rings which I employ. This saves considerable expense in the manufacture of the article and reduces the amount of metal necessary to make the conduit or cable clamp.

Having thus described this invention in connection with illustrative embodiments thereof, to the details of which I do not desire to be limited, what is claimed as new and what is desired to secure by Letters Patent is set forth in the appended claims.

What I claim is:—

1. The combination of a conduit or cable clamp having a hook portion and a base, a securing screw, a removable securing member adapted to be held on the base by the securing screw, said member being provided with a groove, and a pigtail bridle ring having a shank mounted in said groove.

2. The combination of a conduit or cable clamp having a hook portion and a base, a securing screw, a removable securing member adapted to be held on the base by the securing screw, and a pigtail bridle ring having a shank held by the removable securing member, the end of the shank being bent to form an arm.

3. The combination of a conduit or cable clamp having a hook portion and a base, a securing screw, a removable securing member provided with a slot to permit the member to be slipped under the head of the securing screw, and also provided with a groove to coöperate with the shank of a bridle ring, and a pigtail bridle ring having a shank adapted to fit into said groove and be held on the conduit or cable clamp by the removable securing member.

4. A removable securing member to be used with a conduit or cable clamp to support the shank of a pigtail bridle ring, having an open slot and two arms, each of the arms being provided with grooves to coöperate with the shank of a bridle ring.

HENRY B. NEWHALL.

Witnesses:
A. M. WILLIAMS,
M. R. RYAN.